US 6,593,911 B1

(12) United States Patent
Murphy (10) Patent No.: US 6,593,911 B1
(45) Date of Patent: Jul. 15, 2003

(54) INFRARED CORDLESS MOUSE WITH MOUSE PAD/RECEIVER

(75) Inventor: Stephen C. Murphy, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/340,722

(22) Filed: Jun. 29, 1999

(51) Int. Cl.⁷ ................................................. G09G 5/08
(52) U.S. Cl. ........................................ 345/163; 345/166
(58) Field of Search ................................ 345/163–166, 345/158, 157, 156, 173, 175, 102

(56) References Cited

U.S. PATENT DOCUMENTS

| 4,754,268 A | * | 6/1988 | Mori ............................ 345/163 |
| 5,181,181 A | * | 1/1993 | Glynn ........................... 345/163 |
| 5,202,950 A | | 4/1993 | Arego et al. |
| 5,390,276 A | | 2/1995 | Tai et al. |
| 5,459,489 A | | 10/1995 | Redford |
| 5,608,837 A | | 3/1997 | Tai et al. |
| 5,678,334 A | | 10/1997 | Schoniger |
| 5,684,354 A | | 11/1997 | Gleckman |
| 5,726,684 A | | 3/1998 | Blankenship et al. |
| 5,774,063 A | | 6/1998 | Berry et al. |
| 5,820,968 A | * | 10/1998 | Kurani ........................ 345/163 |
| 5,828,365 A | * | 10/1998 | Chen ........................... 345/163 |
| 5,831,697 A | | 11/1998 | Evanicky et al. |
| 5,835,173 A | | 11/1998 | Inbar et al. |
| 5,854,872 A | | 12/1998 | Tai |
| 5,861,969 A | | 1/1999 | Yasuda |
| 6,351,260 B1 | * | 2/2002 | Graham et al. |

FOREIGN PATENT DOCUMENTS

| JP | 04205129 | * | 7/1992 |
| JP | 10124254 | * | 5/1998 |
| JP | 10149255 | * | 6/1998 |

OTHER PUBLICATIONS

U.S. patent application Ser. No. 09/302,906, Andrews, filed Jun. 29, 1999.

* cited by examiner

Primary Examiner—Regina Liang
(74) Attorney, Agent, or Firm—Perkins Coie LLP (57) ABSTRACT

A cordless mouse with a transmission port for transmitting light signals downwardly into a mouse pad. The mouse pad includes a lower section and an upper section. The upper section is made of a LCD backlighting material which is arranged to direct the signals toward a light pipe on a side of the upper section. A receiver in communication with the light pipe receives the light signals and transmits them to a computer.

43 Claims, 5 Drawing Sheets

INFRARED CORDLESS MOUSE WITH MOUSE PAD/RECEIVER

FIELD OF TIE INVENTION

The present invention relates to an apparatus for communicating signals to a computer. More particularly, the present invention relates to an apparatus, system and method for communicating signals from a cordless mouse to a computer.

BACKGROUND OF THE INVENTION

Mice for use with computers are well known. A problem associated with corded mice is that the cords often get in the way and are annoying. Cordless mice which use optical signals are also known.

A particular disadvantage of an optical cordless mouse is that the receiver and transmitter must be in alignment, and there must be an unblocked pathway between the two, in order for the mouse to effectively and without error transmit its signals to the receiver. Further, the mouse moves and the distance and angle between a cordless mouse transmitter and the computer receiver is variable, and thus not always reliable. In addition, the distance and/or angle between the transmitter and receiver may be large, requiring a powerful signal to assure error-free communication. This results in the need for more powerfull (and more expensive batteries) and/or more frequent battery change-outs. Further, a more powerfull transmitter and/or receiver may be required.

Further, since the mouse is manually operated, it is possible that the operator's finger could block the transmitter, much like an amateur photographer takes a picture partially obscured by his finger/thumb.

SUMMARY OF THE INVENTION

The present invention provides a cordless mouse for use with a computer which addresses the foregoing problems. The mouse includes an outer structure having upper and lower surfaces, a mouse track ball projecting from the lower surface, and a light signal transmission port also located in the lower surface. The transmission port is capable of transmitting mouse movement and selection signals to a special mouse pad described below. In an aspect of the invention, the transmission port is adapted to transmit infrared signals representing the mouse movement and selection signals.

The mouse is used in conjunction with a mouse pad which includes a lower section, an upper section capable of receiving light signals transmitted by the mouse, a light pipe in communication with the upper section for guiding the received signals, and a receiver in communication with the light pipe and adapted to receive the signals from the mouse and convert them into electrical signals which are transmitted over an electrical or other signal path to a computer. In an aspect of the invention, the signals transmitted by the mouse and received by the mouse pad are infrared signals and the receiver is adapted to transform the infrared signals into electrical signals readable by the computer.

In another aspect of the invention, the mouse pad further includes a transmission absorbing material positioned opposite the light pipe and adjacent the upper section of the mouse pad. The absorbing material is capable of absorbing misdirected infrared signals transmitted from the mouse which are not directed toward the light pipe.

In another aspect of the invention, the receiver is physically connected to and in communication with the computer through an electrical signal transmission line.

These and other features and advantages of the invention will be more clearly understood from the following detailed description of the invention which is provided in connection with the accompanying drawings.

DETAILED DESCRIPTION OF PREFERRED EMBODIMENTS

Figure 1:
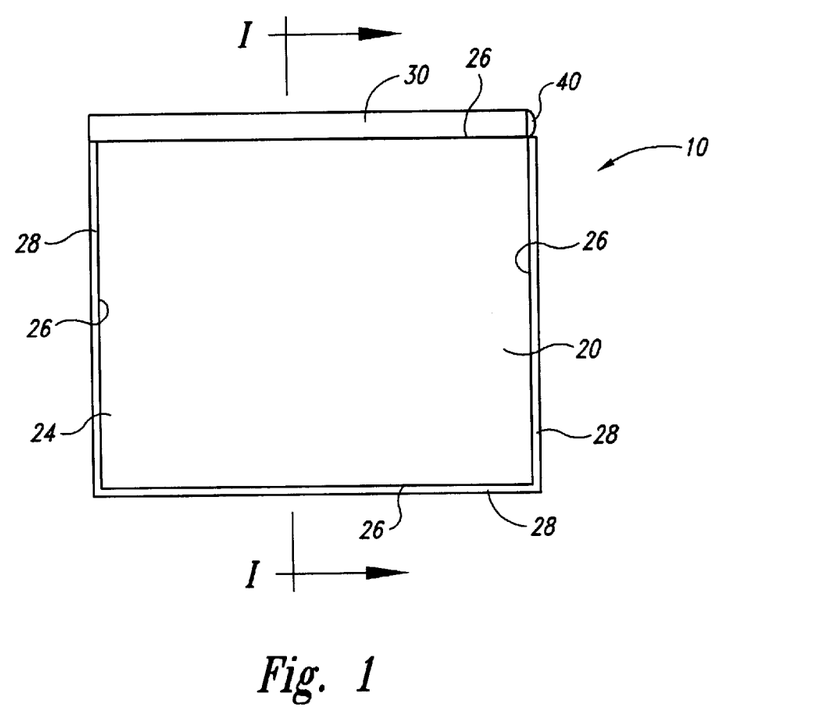
FIG. 1 is a top view of a mouse pad constructed in accordance with one embodiment of the present invention.
Figure 2:
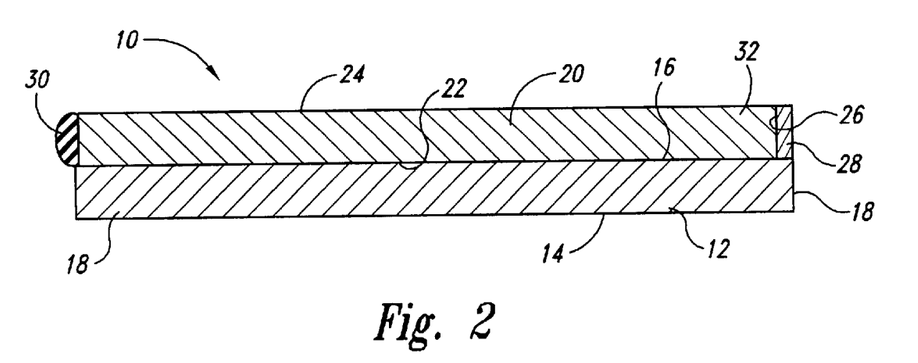
FIG. 2 is a cross-sectional view taken along line I—I of FIG. 1.

With reference to FIGS. 1–2, there is shown a mouse pad 10 with a lower section 12 and an upper section 20. The lower section 12 is preferably formed of a resilient material, such as, for example, a foam-like material. Further, the lower section 12 should be formed of a material which provides sufficient frictional characteristics so as to prevent undue movement of the mouse pad 10 during operation. The lower section 12 includes an under surface 14 and a top surface 16. Further, the lower section 12 includes a plurality of sides 18.

The upper section 20 is positioned above the top surface 16 of the lower section 12. The upper section 20 includes a lower surface 22 which abuts the top surface 16 of the lower section 12. Further, the upper section 20 includes an upper surface 24. A light pipe 30 is positioned adjacent to and in communication with one of the sides 26 of the upper section 20. Positioned on the remaining three sides of the upper section 20 is a light absorbing material 28.

The upper section 20 is formed of a material capable of receiving light signals from a mouse 50 (to be described in detail below) and of directing those signals to the light pipe 30. The light signals are preferably infrared signals. Preferably, the upper section 20 is formed of a liquid crystal display (LCD) back lighting material 32. The LCD back lighting material 32 is conventionally used in portable computer display systems, televisions, and other electronic display devices for diffusing light across the entire display screen from one or more side edges to provide a sufficiently bright backlight level with a minimum of power consumption. The back lighting material 32 may be formed of any suitable material, such as, for example, a polycarbonate material or a poly(methyl methacrylate) material, such as LUCITE®.

In the present invention, the LCD back lighting material 32 is essentially operated inversely to its normal way of operating. That is, light entering into the material 32 from the top surface 24 is directed toward the light pipe 30. Any light entering from the top surface 24 which is directed toward other sides of the upper section 20 are to a large extent absorbed by the light absorbing material 28 such as a dark material to thereby minimize the possibility of generating reflection signals and transmitting them to the light pipe 30.

As noted above, the light pipe 30 extends along one of the sides 26 of the upper section 20 of the mouse pad 10. At an end of the light pipe 30 is positioned a receiver 40 for receiving the light signals transmitted through the upper section 20 and the light pipe 30. The receiver 40 may be physically connected to the light pipe 30. Alternatively, the receiver 40 may be a part of the computer system and physically displaced from the light pipe 30 and the signals from the light pipe 30 may be transmitted by infrared or radio frequency to the receiver 40. If the signals are transmitted from the light pipe 30 to the receiver 40 through radio frequency, a suitable frequency, i.e., one which does not interfere with the computer system's operating frequencies, must be chosen.

Figure 3:
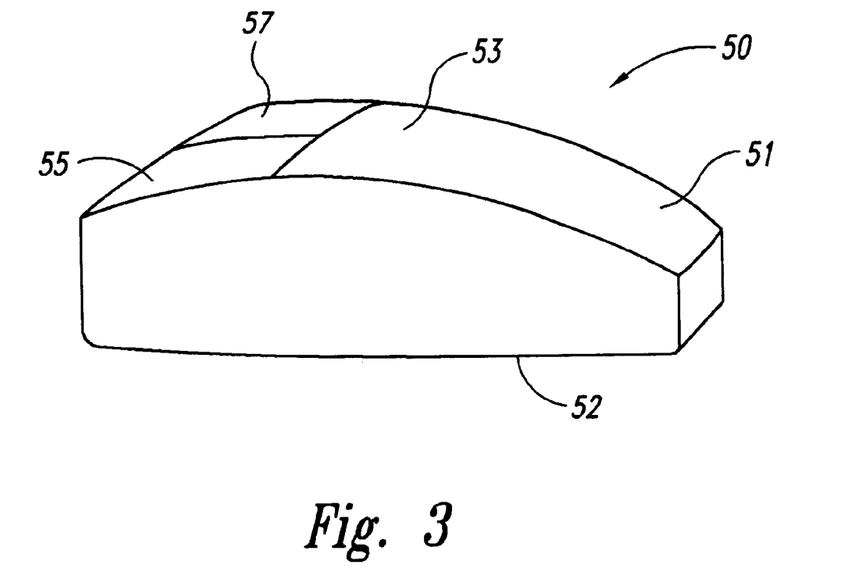
FIG. 3 is a perspective view of a mouse constructed in accordance with another embodiment of the present invention.
Figure 4:
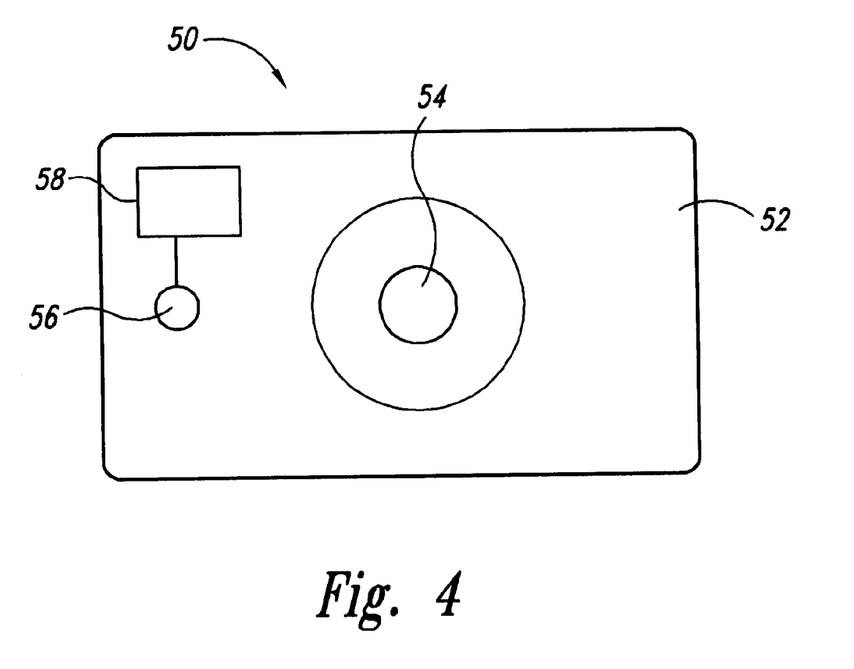
FIG. 4 is a bottom view of the mouse of FIG. 3.

With reference to FIGS. 3–4, the mouse 50 is shown as including a body 51 having an undersurface 52. A mouse ball 54 protrudes through the undersurface 52 and is used to generate movement signals as is well known in the art. The mouse 10 also includes conventional selection ("click") buttons 55, 57 on an upper surface 53. Further positioned on the undersurface 52 of the mouse 50 is a transmission port 56 for transmitting light signals from the mouse 50 to the mouse pad 10. Shown schematically in FIG. 4 is a signal generator 58 which converts the movement signals from the movement of the mouse ball 54 and the signals generated by the selection buttons 55, 57 into light signals for further transmission through the port 56.

The mouse 50 is configured like a conventional cordless mouse which generates infrared light signals in accordance with movement of the mouse 50 over a surface (through signals generated by the mouse ball 54) and operation of the selection buttons 55 and 57 by a user. The circuitry for the conventional aspects of the mouse 50 is well known in the art, and examples of suitable circuitry may be found in U.S. Pat. No. 5,861,969 (Yasuda) and U.S. Pat. No. 5,726,684 (Blankenship et al.). However, unlike a conventional cordless mouse, the mouse 50 has its output infrared port 56 on its bottom surface. Accordingly, all infrared signals from the mouse 50 are directed downwardly from the undersurface 52 of the mouse 50.

In operation, pressure on one of the two operating buttons 55, 57 of the mouse 50 and/or movement of the mouse 50 over the top surface 24 of the mouse pad 10 will create signals which are sent to the signal generator 58, which will then convert the signals to light signals which are transmitted through the transmission port 56 into the upper section 20 of the mouse pad 10.

Figure 5:
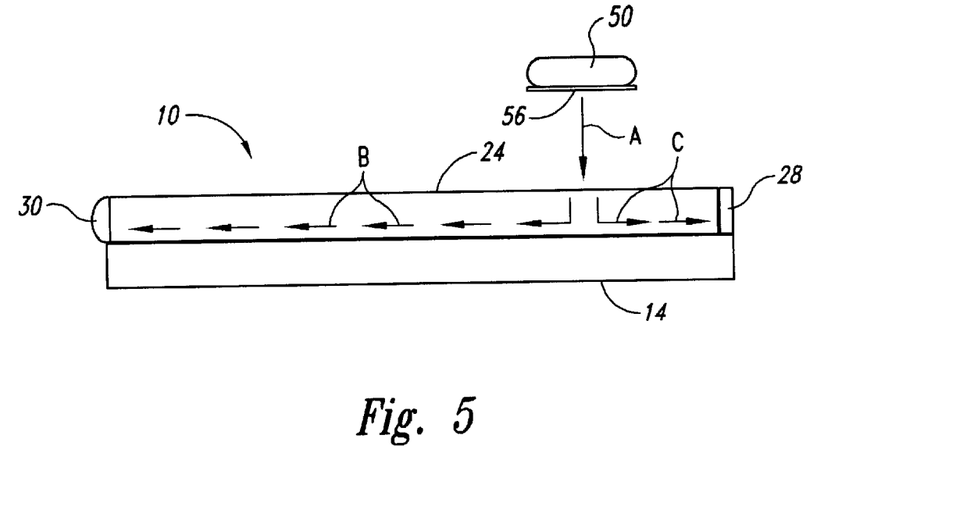
FIG. 5 is a schematic view from the side of the mouse pad of FIG. 1 and the mouse of FIG. 3.
Figure 6:
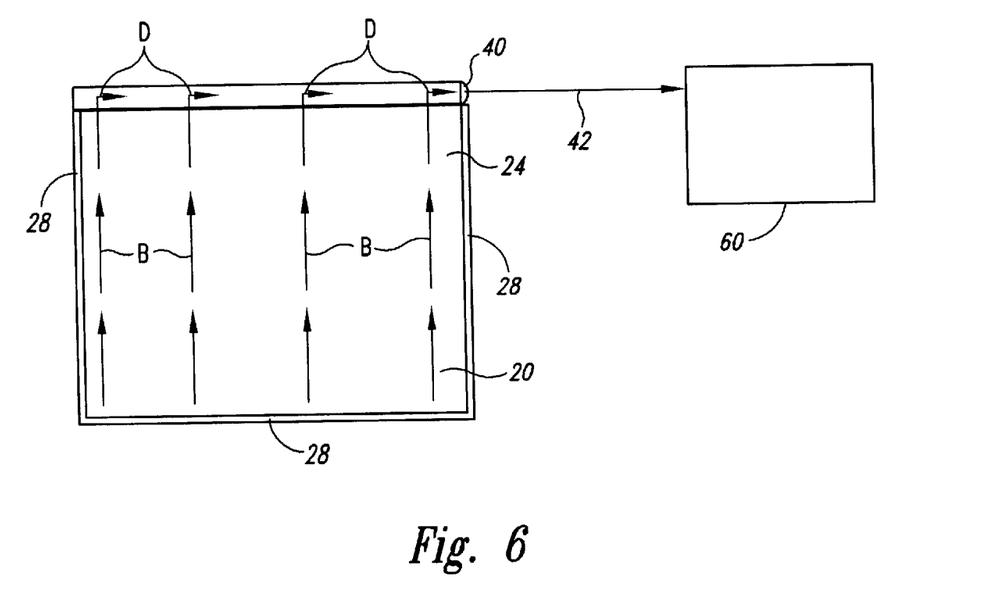
FIG. 6 is a schematic view from the top of the mouse pad of FIG. 1.

With reference to FIGS. 5–6, the light signals are transmitted from the transmission port 56 in the direction of the arrow A which is substantially normal to the upper surface 24. FIG. 5 shows the mouse 50 as separated from the upper surface 24 of the mouse pad 10. This separation is provided only for clarity in describing the invention, and it is to be understood, that the normal operation of the mouse 50 would be with the mouse ball 54 resting on the upper surface 24 of the mouse pad 10 and rolling there along.

As the light signal enters the upper section 20 of the mouse pad 10, the LCD back lighting material 32 directs the signal in the direction of the arrow B toward the light pipe 30. Any light signals which are transmitted in other directions, shown schematically as the arrows C, will be absorbed by the light absorbing material 28 to minimize undesired reflection signals. As the light signals enter the light pipe 30, they change direction and are transmitted along a longitudinal axis of the light pipe 30 in the direction of the arrows D (FIG. 6) toward the light receiver 40 which converts the light signals into electrical signals. As shown in FIG. 6, the light receiver 40 is electrically connected to a computer 60 by way of a transmission line 42. Thus, the light signals transmitted from the light pipe 30 to the light receiver 40 are further transmitted as electrical signals over the transmission line 42 to the computer 60 where the signals are interpreted in a conventional manner and used to operate the computer 60.

Figure 9:
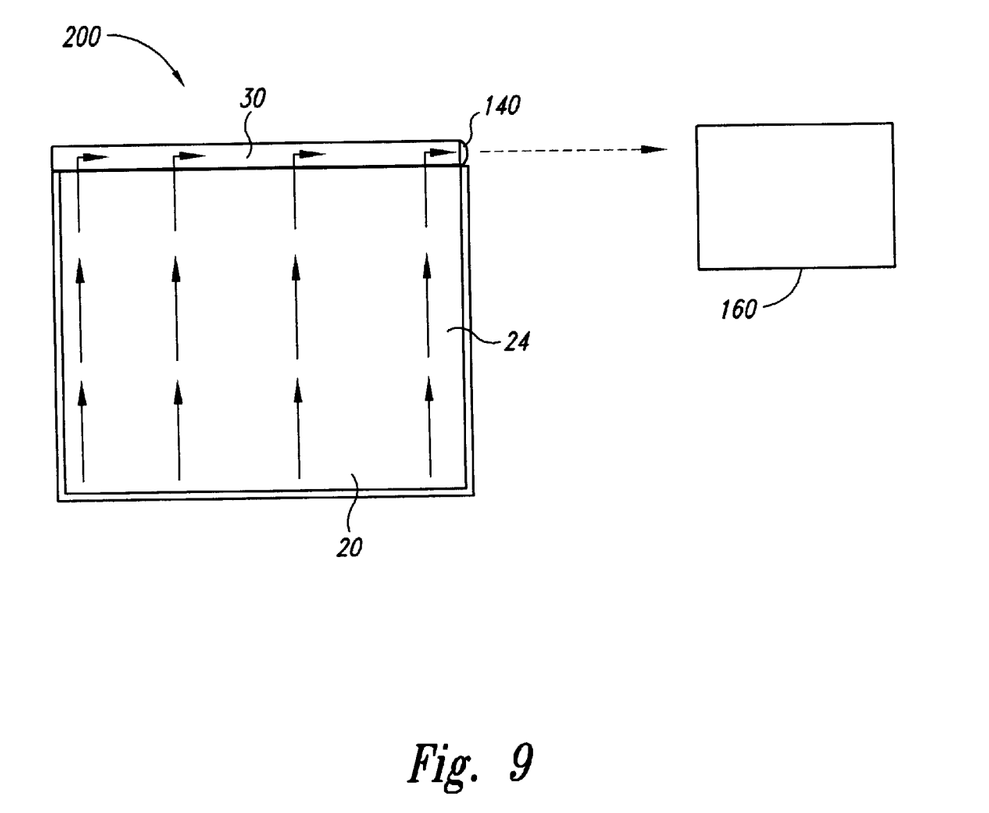
FIG. 9 is a schematic view from the top of a mouse pad constructed in accordance with another embodiment of the present invention.

With reference to FIG. 9, a variation to the FIGS. 5, 6 system is shown. Specifically, a mouse pad 200 is shown including an upper section 20 having an upper surface 24 and a light pipe 30. As with the embodiment described with reference to FIGS. 5–6, light signals transmitted from the mouse 50 enter the upper section 20 of the mouse pad 200 and are directed toward the light pipe 30. Once entering the light pipe 30, the signals bend and are transmitted along a longitudinal axis of the light pipe 30 to a light receiver 140. The light receiver 140 differs from the light receiver 40 in that it is in communication with a computer 160, not by way of an electrical transmission line 42, but through a wireless communication link. Specifically, the light receiver 140 may retransmit the light signals to the computer 160 by way of infrared waves with or without light amplification. Alternatively, the light receiver 140 may transmit the signals to the computer 160 by way of radio frequency, keeping in mind that a suitable radio frequency must be chosen which does not interfere with the electronics of the computer 160. The translation of the light signals from the mouse 50 into computer readable signals may be accomplished at the computer 60, 160 according to conventionally known methods.

Figure 7:
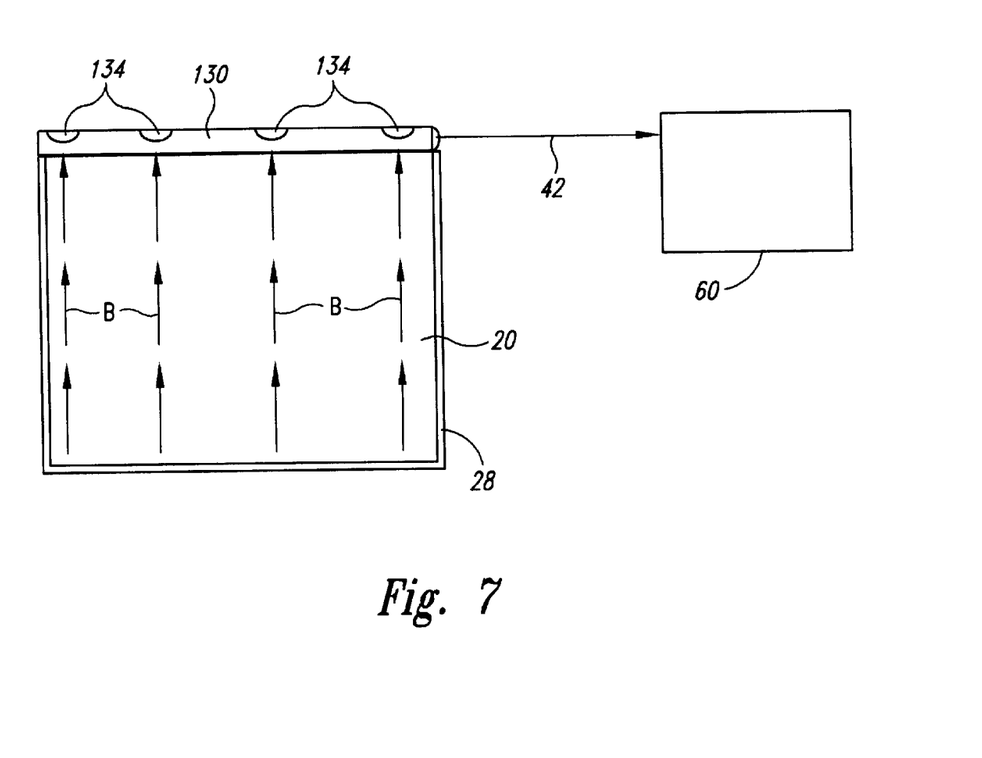
FIG. 7 is a schematic view from the top of a mouse pad constructed in accordance with another embodiment of the present invention.
Figure 8:
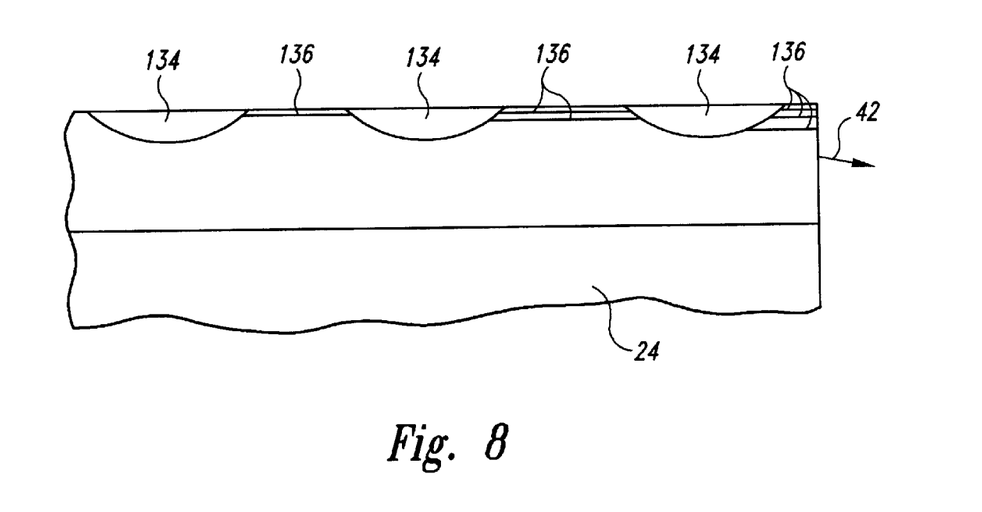
FIG. 8 is a close up view of a portion of the light pipe of the mouse pad of FIG. 7.

With reference to FIGS. 7–8, another embodiment of the present invention is illustrated. Specifically, a mouse pad 100 including an upper section 20 having an upper surface 24 is shown in communication with a light conduit 130. Positioned within the light conduit 130 are a plurality of sensors 134. The sensors 134 are shown in FIGS. 7 and 8 as spaced farther apart than would normally occur in order to provide greater clarity in describing the invention. Each of the sensors 134 is capable of receiving a light signal from the upper section 20 and converting it to an electrical signal. Thus, the signals transmitted from the mouse 50 to the upper section 20 are directed into the light receiver 130. Once entering the light receiver 130, one or more of the sensors 134 receive the light signals, convert them into electrical signals and retransmit them along the sensor lines 136 to the computer 60, 160. The sensors 134 may be wired in parallel to thereby collectively produce electrical signals for use by the computer 60, 160. As in previously discussed embodiments, the signals can be sent from the mouse pad 10 to the computer 60, 160 by wires or through an infrared or radio frequency transmission link.

The invention provides a mechanism for transmitting signals from a cordless mouse 50 to a computer 60, 160 without experiencing problems with aligning the mouse transmitter with the computer. Specifically, the invention provides for a downward transmission of light signals from a port 56 on the undersurface 52 of the mouse 50 into a specially designed mouse pad 10. The mouse pad 10 includes a structure for transmitting the light signals to a computer, either through an electrical link or via a wireless link. The invention improves upon wired mice by eliminating the inconvenience of the wire and it improves upon conventional wireless mice by standardizing the distance between the transmitter and the receiver of the light signals.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, although the mouse 50 is described in terms of two operating buttons 55, 57, it is to be understood that any number of operating buttons, such as three operating buttons, as well as wheels, toggle switches, or other types of switches may be provided. Accordingly, the invention is not to be seen as limited by the foregoing description, but is only limited by the scope of the appended claims.

What is claimed to be protected by Letters Patent of the United States is:

1. A mouse pad for use with a cordless mouse, said pad comprising:
    an upper section capable of receiving light signals and transmitting them, the upper section having a periphery including a first side and a remainder;
    an optical communication device in communication with the first side of the upper section for receiving said light signals transmitted by said upper section and further transmitting said light signals;
    a transmission signal absorbing material positioned on the remainder of the periphery of the upper section; and
    a light receiver adapted to receive said light signals from said optical communication device.

2. The mouse pad of claim 1, wherein said optical communication device comprises a light pipe.

3. The mouse pad of claim 2, wherein said light receiver is adapted to transform said light signals into electrical signals readable by a computer.

4. The mouse pad of claim 3, wherein said light signals are infrared signals.

5. The mouse pad of claim 4, further comprising a computer in communication with said light receiver.

6. The mouse pad of claim 5, wherein said light receiver is electrically connected to and in communication with the computer through a signal transmission line.

7. The mouse pad of claim 5, wherein said light receiver transmits said infrared signals to said computer.

8. The mouse pad of claim 1, further comprising a lower section made of a resilient material.

9. The mouse pad of claim 8, wherein said resilient material is a foam-like material.

10. The mouse pad of claim 1, wherein said optical communication device comprises at least one light sensor capable of receiving said light signals, said at least one sensor in communication with said light receiver.

11. The mouse pad of claim 1, wherein said upper section comprises a liquid crystal display back lighting material.

12. The mouse pad of claim 11, wherein said liquid crystal display back lighting material comprises a polycarbonate material.

13. The mouse pad of claim 11, wherein said liquid crystal display back lighting material comprises a poly(methyl methacrylate) material.

14. A system for transmitting signals from a cordless mouse to a computer, said system comprising:
    a cordless mouse capable of transmitting light signal; and
    a mouse pad comprising:
        an upper section capable of receiving said light signals and transmitting them, the upper section having a periphery including a first side and a remainder;
        an optical communication device in communication with the first side of the upper section for receiving said light signals transmitted by said upper section and further transmitting said light signals;
        a transmission signal absorbing material positioned on the remainder of the periphery of the first side; and
        a light receiver adapted to receive said light signals from said optical communication device; and
    wherein said light signals transmitted from said mouse are computer control signals.

15. The system of claim 14, further comprising a computer in communication with said light receiver.

16. The system of claim 15, wherein said mouse comprises:
    a housing having a lower surface;
    a ball located in said lower surface which provides movement signals representing movement of said mouse over a surface;
    at least one selection switch for providing selection signals;
    a signal generator for converting said movement and selection signals into light signals; and
    a transmission port directing said light signals in a downward direction to a location outside of said housing.

17. The system of claim 16, wherein said light signals are infrared signals.

18. The system of claim 17, wherein said transmission port is located on an undersurface of the mouse.

19. The system of claim 17, wherein said at least one selection switch comprises at least one operating button on an upper surface of said mouse.

20. The system of claim 19, wherein said at least one selection switch comprises at least two operating buttons.

21. The system of claim 19, wherein said at least one selection switch comprises three operating buttons on said upper surface.

22. The system of claim 17, wherein said light receiver is adapted to transform said infrared signals into signals readable by said computer.

23. The system of claim 22, wherein said light receiver is electrically connected to and in communication with said computer through a signal transmission line.

24. The system of claim 17, wherein said light receiver transmits said infrared signals to said computer.

25. The system of claim 24, wherein said optical communication device comprises at least one light sensor capable of receiving said light signals, said at least one sensor being in communication with said light receiver.

26. The system of claim 15, wherein said optical communication device comprises a light pipe, said light pipe being in communication with said light receiver.

27. A method for transmitting signals from a cordless mouse to a computer, said method comprising:
    generating computer control signals in response to operation of a cordless mouse;
    transmitting the computer control signals as light signals in a downward direction toward a surface of a mouse pad located outside of the mouse;

receiving the light signals in an optically transmissive first layer of the mouse pad and redirecting the light signals in the first layer laterally toward an optical guide of the mouse pad extending along a transversely-extending side of the first layer;

reducing reflection signals in the first layer by absorbing, in an absorbing material, a portion of the light of the light signals that is not redirected toward the optical guide; and receiving the light signals in the optical guide from the first layer and redirecting the light signals transversely to a light receiver.

28. The method of claim 27, wherein said generation of said computer control signals comprises generation of selection signals in response to operation of a selection switch on said mouse.

29. The method of claim 28, wherein said generation of said computer control signals further comprises generation of movement signals in response to movement of said mouse.

30. The method of claim 27, further comprising the light receiver receiving the light signals and transforming the light signals into electrical control signals and transmitting said electrical control signals to a computer.

31. The method of claim 30, further comprising a conversion of said selection and movement signals into the light signals.

32. The method of claim 31, wherein said conversion comprises converting said selection and movement signals into infrared light signals.

33. A method for transmitting signals from a cordless mouse through a mouse pad to a computer, said method comprising:

generating computer control signals in response to operation of a cordless mouse;

transmitting said computer control signals as light signals in a downward direction to a mouse pad;

receiving the control signals in a liquid display back lighting material that forms an upper section of the mouse pad;

further transmitting said computer control signals within the liquid display back lighting material in a first horizontal direction to an optical communication device in communication with the mouse pad;

further transmitting said computer control signals in a different second horizontal direction from said optical communication device to a light receiver; and further transmitting said computer control signals from said light receiver to a computer.

34. The method of claim 33, wherein said generation of said computer control signals comprises generation of selection signals in response to operation of a selection switch on said mouse.

35. The method of claim 34, wherein generation of said computer control signals further comprises generation of movement signals in response to movement of said mouse.

36. The method of claim 35, further comprising a conversion of said selection and movement signals into light signals by said signal generator.

37. The method of claim 36, wherein said conversion comprises converting said selection and movement signals into infrared light signals.

38. The method of claim 33, wherein said receipt of said light signals in the mouse pad comprises receiving said light signals in an upper section of the mouse pad, said light signals being transmitted from said upper section to said optical communication device.

39. The method of claim 38, further comprising absorbing light signals from the mouse which are not directed toward said optical communication device.

40. The method of claim 39, wherein said light receiver further converts said light signals received from said optical communication device into transmission signals readable by the computer.

41. The method of claim 40, wherein said transmission of said light signals by the mouse comprises transmitting infrared light signals.

42. A system for transmitting computer control signals to a computer, said system comprising:

a cordless mouse adapted to generate computer control signals in response to mouse input and including a transmission port adapted to transmit the computer control signals as light signals directed in a downward direction; and a mouse pad comprising:
an optically transmissive layer having an upper surface adapted to support the mouse, the optically transmissive layer comprising a liquid display back lighting material that is adapted to receive the light signals from the transmission port of the mouse and transmit the light signals in a first direction to a laterally extending first side of the optically transmissive layer;

a light pipe extending along the first side of the optically transmissive layer and adapted to redirect the light signals from the optically transmissive layer in a different second direction toward an end of the light pipe;

a signal absorbing material extending along a second side of the optically transmissive layer, the second side being opposite the first side; and a light receiver carried adjacent the end of the light pipe and adapted to convert the light signals received from the light pipe into an electrical signal.

43. A system for transmitting computer control signals to a computer, said system comprising:

a cordless mouse adapted to generate computer control signals in response to mouse input and including a transmission port adapted to transmit the computer control signals as light signals directed in a downward direction; and a mouse pad comprising:
an upper section made of a liquid crystal display back lighting material, the upper section having an upper surface adapted to support the mouse, the upper section being adapted to receive the light signals from the transmission port of the mouse and transmit the light signals in a first horizontal direction to a laterally extending first side of the upper section;

a lower section made of a resilient, foam-like material attached to a lower surface of the upper section;

a light transmitting means extending along the first side of the upper section and adapted to transmit the light signals from the upper section in a different second horizontal direction toward an end of the light transmitting means; and a light receiver adapted to convert the light signals received from the light pipe into an electrical signal.

* * * * *

UNITED STATES PATENT AND TRADEMARK OFFICE
CERTIFICATE OF CORRECTION

PATENT NO.     : 6,593,911 B1                                         Page 1 of 1
DATED          : July 15, 2003
INVENTOR(S)    : Stephen C. Murphy It is certified that error appears in the above-identified patent and that said Letters Patent is hereby corrected as shown below:

Column 1,
Line 5, "TIE" should be -- THE --;
Lines 27 and 29, "powerfull" should be -- powerful --;

Column 6,
Line 3, "signal" should be -- signals --;

Signed and Sealed this

Seventeenth Day of February, 2004

JON W. DUDAS
*Acting Director of the United States Patent and Trademark Office*